April 7, 1942.   M. H. A. LINDSAY ET AL   2,278,936
RADIANT ENERGY RECEIVING SYSTEM
Filed April 25, 1939

INVENTORS
M. H. A. LINDSAY
H. J. PEARSON
BY  a. a. Smith
ATTORNEY

Patented Apr. 7, 1942

2,278,936

UNITED STATES PATENT OFFICE 2,278,936

RADIANT ENERGY RECEIVING SYSTEM

Maxwell H. A. Lindsay, Summit, N. J., and Howard J. Pearson, New York, N. Y., assignors to American District Telegraph Company, Jersey City, N. J., a corporation of New Jersey Application April 25, 1939, Serial No. 269,880

15 Claims. (Cl. 250—83.3)

This invention relates generally to burglar alarm systems and apparatus, and more particularly to systems employing infra-red radiant energy and embodying a detector having great sensitivity to energy in the range to which photocells are totally or practically unresponsive. A sensitive detector of radiant energy permits detection of burglars over long distances. Such systems are particularly useful since a compact apparatus can be used for protecting offices, stores and the like where it is necessary that the detection apparatus be easily concealed and occupy a minimum amount of space, and where it has previously been necessary to provide extensive wiring and contacting devices found expensive to install and maintain. Furthermore, the radiant energy system is inherently secret and not easily defeated for that reason. Such systems are further advantageous in that they create invisible barriers through which an intruder may penetrate without realizing the existence of any sort of detection system. The radiant energy system also presents the advantage that it is capable of viewing and thus protecting large areas with the use of a single transmitter and receiver whereby necessary apparatus and wiring is reduced to a minimum.

Radiant energy detection systems are also particularly useful in outdoor applications such as waterfronts, prison walls and the like where peculiar problems arise in that weather conditions defeat ordinary apparatus such as that of the photoelectric type. However, the system disclosed herein utilizes radiant energy within that portion of the infra-red band between the wave lengths of approximately 0.78 micron and 30 microns which is capable of penetrating heavy fogs and even heavy snow storms thus providing protection during all conditions of weather. Heretofore it has been necessary to employ physical barriers involving the use of extended circuits in protecting large outdoor areas but by means of the infra-red beam it is possible to generate a single beam of invisible radiant energy, which must be penetrated or interrupted by intruders, and thereby create an intangible barrier of great length with a minimum amount of apparatus.

The principal object of this invention is to provide, in a burglar alarm system, a receiver that is capable of viewing and thus sensing or detecting the presence of a burglar independently of any act of commission or omission on his part other than his entrance into and natural movements about a forbidden area or locality.

It is also an object of this invention to provide, in a burglar alarm system, a receiver for viewing an area and thus detecting the presence of a burglar by detecting the heat energy given off or absorbed by his own body, or absorbed or reflected by objects carried by the intruder.

Still another object of this invention is to provide a radiant energy detector capable of detecting minute changes in radiant energy over long distances and which is practicable in commercial use, cheaply manufactured and positive in operation.

A still further object of this invention is to provide an infra-red energy receiver for outdoor use and sensitive enough to respond to alarm conditions during fog or other adverse weather conditions.

It is also an object of this invention to provide extremely sensitive materials capable of responding to minute quantities of radiant energy in the infra-red range and controlling a signal generating apparatus to obtain useful signals.

Still another object of this invention is to provide a method of charring vegetable fibers in such a manner that the ultimate sensitivity to radiant energy may be obtained.

Other objects and advantages of this invention will appear from consideration of the following description taken in connection with the accompanying drawing, wherein.

Figure 1:
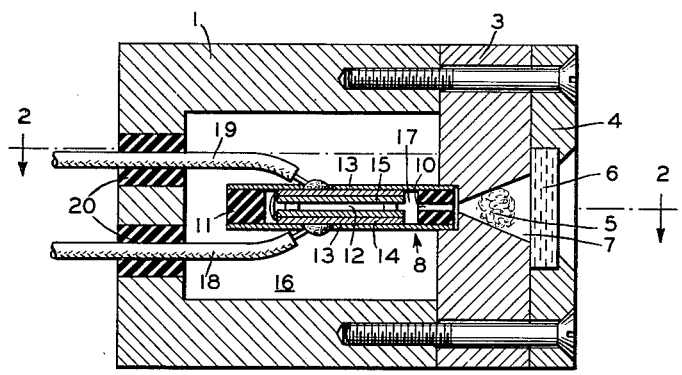
Fig. 1 is a cross section of a radiant energy detecting unit constructed in accordance with this invention.

In accordance with the objects of this invention, we provide a radiant energy receiving device of great sensitivity by using a gas-occluding substance in a chamber containing a gas for causing pressure variations therein in response to changes in total radiant energy and by arranging a voltage generating element for converting pressure changes into variations in voltage in operative relation to said chamber.

It is well known from thermodynamic laws that the relation between the pressure and temperature of a gas is expressed by the equation:

$$PV = RT$$

where P is the pressure, V the volume, T the absolute temperature, and R the universal gas constant. Now if V is kept constant, P will be proportional to T. Any sealed cavity then, containing a gas, and having a window for the admission of radiant energy and a means for indicating the resulting pressure change, would constitute a radiometer. Unfortunately this combination does not have sufficient sensitivity for practical purposes where small quantities of radiation, such as are emitted by a remote human body, are concerned. If, however, a substance is introduced into the cavity which has, first, the property of occluding relatively large quantities of the gas and, second, the ability of discharging the gas and thus raising the pressure a proportionate amount when heat is applied to the substance, a major improvement results. It also follows that a material which expands appreciably when heated will result in still further improvement. Such substances are herein to be disclosed.

The property of occluding gas is termed adsorption and in order that a material have considerable adsorptive capabilities, it is believed necessary both that the extent of its surface be great and that the degree of unsaturation of the surface atoms be high. The first condition is favored by a decrease in particle size or increase in the volume of capillaries for a given weight of material, and the second, in addition, by the presence of crystal fragments and by a decrease in crystal size, so that the atoms which are less saturated by their neighbors, such as the corner atoms, form a greater percentage of the total.

These requirements are met by employing hydrocarbons formed by destructive distillation of such organic materials as pure silk, cotton, or other vegetable fibers such as the pappus of thistle, dandelion or baccharis at temperatures ranging from 500° C. to 1000° C. for periods of not more than 60 minutes. These materials are capable of readily discharging adsorbed gas upon the application of heat because they absorb a large proportion of incident radiation, the thermal capacities are negligible and the specific density is low. Since these materials possess, in addition to their high absorptive properties, characteristics which meet these three conditions, they theoretically are the best materials for the purpose and experimentation substantiates this theory.

There are several methods of reducing the above materials to a hydrocarbon but the preferred one is as follows. In preparing any of the above materials, it is necessary to remove from the fibers all dirt which may be clinging thereto. The material is then inserted in a small non-combustible sealed container from which as much air as possible has been removed. The container, which must be air tight to prevent ashing or complete combustion of the material, is then inserted within a furnace which has been heated to a temperature of 950° C. and allowed to remain therein for approximately fifteen minutes. This charring process produces charred fibers which are the most sensitive hydrocarbons for use in the above described detector unit.

Another method of charring the above described vegetable fibers comprises cleaning a small quantity of the material and placing it in a porcelain crucible which has been provided with a false bottom or tray of copper gauze. The material rests on the gauze and is thereby protected from scorching on the excessively hot bottom of the crucible. The lid of the crucible is left slightly ajar to permit the escape of distillation products. After a Bunsen flame has been applied to the bottom of the crucible for a few minutes, a light smoke begins to issue from the crucible. When the smoke ceases to come off, the flame is removed and the crucible is allowed to cool for a minute or two. If this part of the process has been completed without scorching or burning of the material, the crucible cover is replaced, not ajar, but resting on top of the crucible in the ordinary manner, and a hot flame is applied for approximately fifteen minutes. This reroasting increases the adsorbing power of the carbonized material considerably.

In order for material to readily discharge the adsorbed gas when heat is applied, the material or its surface must be capable of absorbing a large proportion of the incident radiation, the thermal capacities must be negligible and the specific density must be low. It is readily seen that the hydrocarbons, formed by the above process, possess, in addition to high adsorptive properties, characteristics which meet these three conditions.

It is possible to use several different converting elements such as the carbon microphone, the electromagnetic or dynamic type of microphone, the condenser microphone or the piezoelectric microphone. The first two types of microphonic elements lack a sufficient degree of sensitivity to respond effectively to the minute pressures generated by a gas occluding substance. The condenser microphone, while it is sufficiently sensitive, involves the use of polarizing potentials, is liable to leakages for various reasons and requires the running of heavy multi-wire cables. On the contrary, the piezoelectric crystal microphone is a self-contained, pressure-responsive, voltage generating element which overcomes the above mentioned disadvantages and meets the requirements outlined above.

Fig. 1 of the drawing illustrates the application of the above described gas occluding materials and piezoelectric converting elements to detecting of radiant energy within the frequency range which includes visible and invisible heat rays. The converting unit or radiant energy detecting device includes a heavy metal casing 1 which serves as a mechanical protection and also attenuates external pressure waves such as sound which might interfere with reception of the useful radiant energy. The casing of the radiant energy receiving device is closed by the covers 3 and 4, the cover 3 including a chamber 7 which contains the heat or radiant energy responsive material 5. Cover 3 consists of an insulating material whereby escape of radiant energy from chamber 7 is prevented. The material 5 comprises a suitable quantity of any one of the above described fibrous organic substances which have been treated by one of the above mentioned processes of destructive distillation. The chamber 7 is closed by the window 6 which must be pervious to radiant energy to which the device is to respond and may be made of any suitable material but preferably rock salt. The cover 3 supports the piezoelectric converting element 8 in operative relation to the chamber 7 whereby gases given off by the material 5 may expand through a passage 10 into the chamber 12 between piezoelectric crystal elements 14 and 15. The crystal elements 14 and 15 are supported by an insulating frame 11 from thin resilient paper supporting members 13. These thin members may be composed of any suitable material which will support the crystal elements and seal the chamber 12 from the chamber 16 whereby the gases occluded by material 5 are confined between the crystal elements. The space 17 between the frame 11 and the crystals 14 and 15 may be filled with a suitable plastic or insulating compound such as wax for the purpose of further sealing the chamber 12. The piezoelectric converting element may be constructed in accordance with the general theory and principles as taught by the following patents of Charles B. Sawyer: Nos. 1,802,780, 1,802,781, 1,802,782, 1,802,783, 1,803,273, 1,803,274, and 1,803,275, dated April 28, 1931; No. 1,995,257, dated March 19, 1935.

Figure 3:
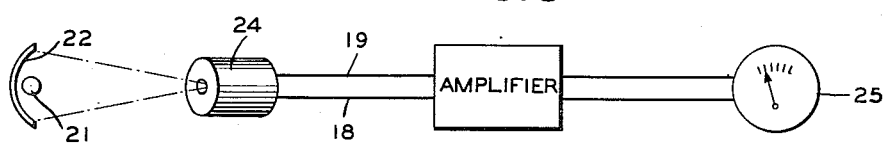
Fig. 3 illustrates a signalling system for utilizing the detecting unit shown in Figs. 1 and 2.

The crystal elements 14 and 15 are connected by conductors 18 and 19 to an amplifier shown in Fig. 3. The casing 1 is provided with sealing and insulating sleeve members 20 for the purpose of sealing the openings provided for the conductors 18 and 19 and preventing the gas within the chamber 16 from being affected by external pressure changes and also external humidity changes.

Figure 2:
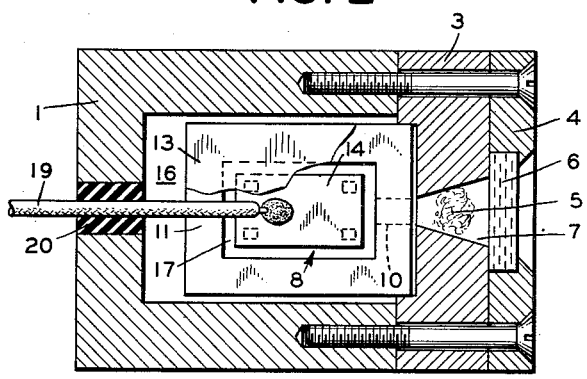
Fig. 2 is a top plan section of Fig. 1 on line 2—2 of Fig. 1.

Fig. 3 of the drawing shows a system for detecting changes in radiant energy by means of the receiving element shown in Figs. 1 and 2. The system consists of a source 21 of radiant energy within the infra-red range and a reflector 22 for directing radiant energy to the receiver 24 which has been described above. Receiver 24 is connected by conductors 18 and 19 to a conventional alternating current amplifier which is in turn connected to an electroresponsive device, such as an indicating meter 25 which indicates the changes in radiant energy caused by interception of the beam emitted by source 21. The source 21 and reflector 22 may be omitted from the system, in which case, the receiver 24 is intended to view a desired zone or area and detect all changes of radiant energy therein. The sensitivity of receiver 24 may be increased, if desired, by using parabolic or other forms of reflectors, or by placing rock salt lenses in front of the detector.

The receiving element 24 operates upon any change of radiant energy since the gas occluding material 5 absorbs or desorbs gas depending upon the direction of change in radiant energy. When the material 5 absorbs or evolves gas, the pressure within the tube 10 and chamber 12 changes and causes deformation of the crystal elements 14 and 15 which in turn generate an electrical impulse in a manner well known to those skilled in the art. This impulse is amplified by amplifier shown in Fig. 3 and operates meter 25 to indicate variations of radiant energy.

Because of the peculiar conditions of heat reflection and absorption which are encountered in different rooms of buildings and in outdoor applications, the radiant energy detecting system described above may not always detect an increase in heat from an intruder's body. The intruder may possibly enter a room, the temperature of which will cause absorption of heat by the intruder's body. It is also possible that due to the color of the walls in an enclosure and to the color of the intruder's clothing that heat will be absorbed or the reflected heat will be altered when the intruder enters or moves about the enclosure. In the case of the system described and shown in Fig. 3 of the drawing, the detector unit 20 will always detect a change in the amount of heat or radiant energy received by it. In other words, movement of an intruder through the beam of radiant energy is certain to change the amount of heat or radiant energy affecting the detecting unit 20 and even though there is a beam of radiant energy directed into the detecting unit it is entirely possible that an intruder may increase the amount of radiant energy in the beam because of the color of his clothing or because of heat reflected from the walls and again reflected by the intruder's body. In any case the apparatus provided by this invention will detect both increases and decreases in the amounts of radiant energy received because of the inherent gas absorbing properties and gas discharging properties of the material 5 in the radiant energy receiver unit. The piezoelectric crystal element follows decreases and increases in gas pressure since any deformation of the crystal element will generate an electrical impulse that can be amplified by the conventional alternating current amplifier. For the above mentioned reasons the radiant energy receiving apparatus is capable of detecting all changes of radiant energy within the infra-red band which may occur because of movements of a burglar or other intruder.

The above described apparatus has a number of further advantages. Because of the inherent characteristics of the piezo-electric crystal element it is not necessary to provide any energizing or polarizing potentials such as would be necessary in other forms of microphone elements. It follows that since there are no high potentials or minute discharge currents there will be no electrical leakage present which would necessitate the use of a pre-amplifier adjacent the detecting unit or heavy multi-wire cables. The piezoelectric crystal element also presents the advantage of having no low frequency cut-off and therefore it will respond to changes of gas pressure of less than one cycle per second. Another advantage of the detector element is that it is inherently airtight and moisture-proof whereby changes in humidity and temperature do not affect the response characteristics thereof. A further advantage is that the heavy casing surrounding the crystal element attenuates all pressure or other mechanical interfering impulses whereby the occurrence of false signals is reduced to a minimum.

The radiant energy burglar alarm system embodying the invention presents the inherent advantage that it is unaffected by weather conditions such as fog or heavy snow storms or any other changing conditions of the weather. On the contrary, signalling systems such as those employing photoelectric cells are incapable of operating through heavy fogs and the like since they respond to light energy of short wave lengths in the visible portion of the spectrum which does not penetrate fog. Therefore the system embodying the invention is particularly useful in outdoor applications such as waterfronts, prison walls and the like, where extended areas may be protected with a minimum quantity of apparatus and wiring. This system may be used for fire detection as well as burglar protection since it is highly sensitive to all radiant energy variations.

Since there may be many variations in adapting this system to a burglar alarm application or to a fire alarm system by those skilled in the art, and as it is applicable to any kind of signalling system, it is not desired that this invention shall be limited to the exact embodiments illustrated and described herein, but only by the extent of the prior art and the appended claims.

What is claimed is:

1. A radiant energy receiver comprising a casing having a chamber therein, a cover for said casing including a conical chamber having a gas therein, a window for closing said conical chamber and admitting radiant energy, a gas-adsorbing substance comprising charred pappus of thistle within said conical chamber and responsive to changes in radiant energy for changing the gas pressure therein, a pair of spaced piezo-electric crystals supported from said cover within said chamber, a passage connecting said conical chamber with the space between said crystals whereby changes in gas pressure within said conical chamber change the gas pressure between said crystals and deform them to generate electrical energy.

2. In combination, a chamber containing a gas, a window for closing said chamber and admitting infra-red energy, a tuft of charred cotton fibers within said chamber which responds to changes in infra-red energy by adsorbing or evolving gas and changing the gas pressure within the chamber, and a voltage generating element responsive to said pressure changes comprising a pair of spaced piezo-electric crystals, a frame for supporting said crystals and a tubular passage connecting said chamber to the space between the said crystals whereby said gas pressure changes deform said crystals in response to changes in infra-red energy.

3. In combination a chamber containing a gas, a window for closing said chamber and admitting infra-red energy, a tuft of charred pappus of dandelion within said chamber which responds to changes in infra-red energy by adsorbing or evolving gas and changing the gas pressure within the chamber, and a voltage generating element responsive to said pressure changes comprising a pair of spaced piezo-electric crystals, a frame for supporting said crystals and a tubular passage connecting said chamber to the space between the said crystals whereby said gas pressure changes deform said crystals in response to changes in infra-red energy.

4. A radiant energy receiver comprising a chamber containing a gas, a quantity of charred cotton in said chamber capable of adsorbing or discharging gas and changing the pressure within said chamber upon a change or infra-red energy therein and a voltage generating device responsive to pressure changes within said chamber for converting pressure changes into changes of electrical energy.

5. A radiant energy receiver comprising a chamber containing a gas, a quantity of charred pappus of dandelion in said chamber capable of adsorbing or discharging gas and changing the pressure within said chamber upon a change of infra-red energy therein and a voltage generating device responsive to pressure changes within said chamber for converting pressure changes into changes of electrical energy.

6. A radiant energy receiver comprising a chamber containing a gas, a quantity of charred pappus of thistle in said chamber capable of adsorbing or discharging gas and changing the pressure within said chamber upon a change of infra-red energy therein and a voltage generating device responsive to pressure changes within said chamber for converting pressure changes into changes of electrical energy.

7. A radiant energy receiver comprising a chamber containing a gas, a quantity of charred pappus of flowers of the composite family in said chamber capable of adsorbing or discharging gas and changing the pressure within said chamber upon a change of infra-red energy therein and a voltage generating device responsive to pressure changes within said chamber for converting pressure changes into changes of electrical energy.

8. A radiant energy receiver comprising a casing having a chamber therein, a cover for said casing including a conical chamber having a gas therein, a window for closing said conical chamber and admitting radiant energy, a gas-adsorbing substance of the group consisting of either charred cotton, charred pappus of dandelion, charred pappus of baccharis or charred pappus of thistle within said conical chamber and responsive to changes in radiant energy for changing the gas pressure therein, a pair of spaced piezo-electric crystals supported from said cover within said chamber, a passage connecting said conical chamber with the space between said crystals whereby changes in gas pressure within said conical chamber change the gas pressure between said crystals and deform them to generate electrical energy.

9. In combination, a chamber containing a gas, a window for closing said chamber and admitting infra-red energy, a gas adsorbing substance within said chamber of the group consisting of charred cotton, charred pappus of dandelion, charred pappus of baccharis or charred pappus of thistle which responds to changes in infra-red energy by adsorbing or evolving gas and changing the gas pressure within the chamber, and a voltage generating element responsive to said pressure changes comprising a pair of spaced piezo-electric crystals, a frame for supporting said crystals and a tubular passage connecting said chamber to the space between the said crystals whereby said gas pressure changes deform said crystals in response to changes in infra-red energy.

10. A radiant energy receiver comprising a chamber containing a gas, a gas adsorbing substance within said chamber of the group consisting of charred cotton, charred pappus of dandelion, charred pappus of baccharis or charred pappus of thistle capable of adsorbing or discharging gas and changing the pressure within said chamber upon a change of infra-red energy therein and a voltage generating device responsive to pressure changes within said chamber for converting pressure changes into changes of electrical energy.

11. A radiant energy receiver comprising a chamber containing a gas, a quantity of gas occluding charred substance therein which has been cleaned and exposed to a temperature of 950° C. for a period of fifteen minutes in the substantial absence of oxygen, and an energy converting device responsive to pressure changes within said chamber for converting pressure changes into changes of electrical energy.

12. A radiant energy receiver comprising a chamber containing a gas, a quantity of gas occluding charred substance therein which has been exposed to a temperature of between 500° C. and 1000° C. for a period of not over sixty minutes in the substantial absence of oxygen, and an energy converting device responsive to pressure changes within said chamber for converting pressure changes into changes of electrical energy.

13. A radiant energy receiver comprising a chamber containing a gas, a quantity of charred vegetable fibers therein which have been cleaned and exposed to a temperature of 950° C. for a period of fifteen minutes in the substantial absence of oxygen, and an energy converting device responsive to pressure changes within said chamber for converting pressure changes into changes of electrical energy.

14. A radiant energy receiver comprising a chamber containing a gas, a quantity of charred vegetable fibers therein which have been exposed to a temperature of between 500° C. and 1000° C. for a period of not over sixty minutes in the substantial absence of oxygen, and an energy converting device responsive to pressure changes within said chamber for converting pressure changes into changes of electrical energy.

15. A radiant energy receiver comprising a chamber containing a gas, a quantity of charred cotton or equivalent charred material in said chamber capable of absorbing or discharging gas to change the pressure within said chamber on a change of infra-red energy therein, and means for converting pressure changes within said chamber into electrical variations.

MAXWELL H. A. LINDSAY.
HOWARD J. PEARSON.